(12) United States Patent
Gurel (10) Patent No.: US 10,549,223 B2
(45) Date of Patent: Feb. 4, 2020

(54) INNOVATIVE SELF CLEANING FILTER MECHANISM

(71) Applicant: EKO MUHENDISLIK SANAYI VE TICARET LIMITED SIRKETI, Ankara (TR)

(72) Inventor: M. Serdar Gurel, Ankara (TR)

(73) Assignee: EKO MUHENDISLIK SANAYI VE TICARET LIMITED SIRKETI, Ankara (TR)

( * ) Notice: Subject to any disclaimer, the term of this patent is extended or adjusted under 35 U.S.C. 154(b) by 202 days.

(21) Appl. No.: 15/214,477

(22) Filed: Jul. 20, 2016

(65) Prior Publication Data

US 2017/0021290 A1    Jan. 26, 2017

(30) Foreign Application Priority Data

Jul. 21, 2015   (TR) .................................. 2015 08981

(51) Int. Cl.
*B01D 29/66* (2006.01)
*B01D 29/68* (2006.01)

(52) U.S. Cl.
CPC ......... *B01D 29/668* (2013.01); *B01D 29/682* (2013.01); *B01D 29/688* (2013.01); *B01D 2201/082* (2013.01)

(58) Field of Classification Search
None
See application file for complete search history.

(56) References Cited

U.S. PATENT DOCUMENTS

| 4,315,820 A * | 2/1982 | Mann ..................... B01D 29/23 210/408 |
| 4,552,655 A * | 11/1985 | Granot ................. B01D 29/114 210/108 |
| 4,818,402 A * | 4/1989 | Steiner .................. B01D 29/23 210/411 |
| 5,268,095 A * | 12/1993 | Barzuza ................ B01D 29/01 210/143 |
| 5,632,903 A * | 5/1997 | Caracciolo, Jr. ...... B01D 29/117 210/333.01 |
| 5,667,683 A * | 9/1997 | Benian ................... B01D 29/15 210/409 |
| 2006/0043014 A1* | 3/2006 | Takatsuka .............. B01D 29/15 210/411 |

(Continued)

*Primary Examiner* — Jonathan M Peo
(74) *Attorney, Agent, or Firm* — Gokalp Bayramoglu (57) ABSTRACT

The filtering system comprises an inner flow or an outer flow, a shaft, a backwash outlet, a backwash valve, a volume separator rotating disk containing a backwash hole located between the insert and back wash outlet, and a filter cleaning mechanism enabling the cleaning of the dirt particles generated on the filter insert without opening the filter cover. The filtering system contains at least two flow cross-section reducing plates, realizing the speedy passage of the liquid in the insert through the plurality of gaps providing a plurality of reduced flow cross-sections created between the flow cross-section reducing plates and the surface of the insert. A pressure drop is generated during the speedy passage of a liquid through the plurality of gaps. The surface of the insert is cleaned with the passage of the liquid from outside of the insert to the inside of the insert or vice versa.

11 Claims, 7 Drawing Sheets

(56) References Cited

U.S. PATENT DOCUMENTS

2013/0026111 A1* 1/2013 Gil .................... B01D 29/114
                                                        210/791
2013/0291645 A1* 11/2013 Gammon .................. G01L 7/16
                                                        73/716
2013/0306546 A1* 11/2013 Cartarius ............ B01D 29/117
                                                        210/411

* cited by examiner

INNOVATIVE SELF CLEANING FILTER MECHANISM

TECHNICAL FIELD

The invention is related to the innovative self cleaning filter mechanism that enables cleaning the dirt particles on the filter insert without opening the filter cover.

BACKGROUND

Liquid filters are systems that enable the unwanted solid particles in the liquid sent into them to be separated from the liquid by being filtered and the liquid to be cleaned in this way. In the most basic form, liquid filter systems; consist of a dirty liquid inlet sent for cleaning, an insert that the dirty liquid passes through, and a clean liquid outlet which the liquid comes out by being cleaned through the insert. Liquid filters are in two different forms as the liquid's passing through the insert towards outside, or the liquid coming inside from outside of the insert. The solid particles and the unwanted substances in the liquid cannot pass through the insert, and they accumulate on the surface of the insert.

Along with the use of liquid filters for a certain period of time, solid parts accumulate on the pores of the insert during the passage of the dirty liquid through the insert, and start to block the passage of the fluid. With the inhibition of the passage of the liquid through the insert, liquid filter's working capacity decreases, and after a certain period of time, the process of filtering cannot be realized. For the solution of the problem, the insert is taken out of the filter, and is placed inside the filter again after a cleaning process. In such cleaning methods, the process of taking the insert out and installing it back becomes quite difficult, and time consuming.

Various methods are used to clean the insert without taking it out of the filter. One of these methods is cleaning the dirt and solid particles with the pressure of the fluid by opening a valve placed on the end of the filter insert when it is time to clean it without applying any additional mechanisms. In such a method, the liquid cannot be equally applied to all the sections of the insert, and a complete cleaning process cannot be provided. In other filter cleaning methods, hydraulic or pneumatic systems are used which are expensive and complicated. Therefore, they are not preferred both due to their cost and space they occupy.

SUMMARY

The purpose of this invention is to realize a self cleaning filter mechanism that enables the insert to be cleaned by itself without taking it out of the filter.

Another purpose of this invention is to realize a self cleaning filter mechanism without interrupting the filtering process.

Another purpose of this invention is to realize a self cleaning filter mechanism that enables the cleaning of the whole surface of the filter insert by itself.

Another purpose of this invention is to realize a self cleaning filter mechanism that enables the cleaning of the filter insert with the help of the Bernoulli Effect.

Another purpose of this invention is to realize a self cleaning filter mechanism that realizes the process of cleaning in higher efficiency with lower pressure values.

BRIEF DESCRIPTION OF THE DRAWINGS

Innovative self cleaning filter mechanism realized to reach the target of this invention has been shown in the attached figures, and these figures are.

The parts in the Figures are individually numbered, and the equivalence of these numbers has been given below.
1. The self cleaning filter mechanism
2. Body
3. The dirty liquid inlet
4. Insert
5. Clean liquid outlet
6. Filter cleaning mechanism for inner-flow
   61. Shaft
   62. Back wash outlet
   63. Back wash valve
   64. Volume separating rotary disc
   641. Back wash hole
   65. Flow cross-section reducing plate
   651 Orientation slope
7. Filter cleaning mechanism for outer-flow
   71. Rotation system for the insert
   75. Outer flow cross-section reducing plates
   751. External Orientation slope
8. Dirt indication mechanism
   81. Spring
   82. Piston part
   83. Transparent tube

DETAILED DESCRIPTION OF THE EMBODIMENTS

The self cleaning filter mechanism (1) for the filter systems with inner flow, which enables the dirt particles accumulated inside, to be cleaned without opening the filter cover;
   at least one body (2) into which the liquid to be cleaned enters and exits, and in which the process of filtering is made, as the external surface of the mechanism,
   at least one dirty fluid inlet (3) enabling the passage of the dirty fluid desired to be cleaned in the filter body (2),
   at least one insert (4) which the dirty fluid through the dirty fluid inlet (3) is cleaned by filtering while getting outside, at least one clean liquid outlet (5) from which the liquid cleaned in the insert (4) exits from the body (2), applied in the inner side of the filter insert (4), and     at least one shaft (61) laying in the insert (4) longitudinally and possessing rotational freedom,     at least one back wash outlet (62) located in the ceiling section of the insert (4) in the opposite direction of the dirty liquid flow, and enabling the dirty liquid coming into the insert (4) and the dirt particles accumulated in the inner surface of the insert (4) during filtering to be thrown outside directly without being cleaned,     at least one back wash valve (63) to open or close the liquid passage from the back wash outlet (62),     at least one volume separating rotary disc (64) located between the insert (4) and the back wash outlet (62), which is connected to the shaft (61) by its center axis and containing at least one back wash hole (641) enabling the passage of the dirty liquid only through the back wash hole (641) to the back wash outlet (62) by the opening of the back wash valve (63),     at least one inner-flow filter cleaning mechanism (6) with at least two flow cross section reducing plates (65) extending from two sides of the shaft (61) towards the surface of the insert (4) between the back wash hole (641) and dirty liquid inlet (3) creating a fluid flow channel on the inner surface of the insert (4) with the opening of the back wash valve (63), performing a higher flow speed of the liquid into the inside of the insert (4) through the gap between the flow cross section reducing plates (65) and the surface of the insert (4), and dropping the pressure in that area (Bernoulli Effect) during the rapid passage, and a process of cleaning on the surface of the insert (4) with the entrance of the liquid from outside of the insert (4) into the inside of the insert (4) in the areas where pressure drops, at least one dirt indicator mechanism (8) determining the filter contamination rate and whose one side is connected to the dirty liquid inlet (3), and the other side is connected to the section where the filtered liquid is located between the body (2) and the insert (4), and through which the piston part (82) changes location in the transparent tube (83) depending on the pressure force applied by the pressure difference on the spring (81).

The self cleaning filter mechanism (1) for the filters with inner flow which is the subject of the invention (FIG. 1) consists of: a liquid filtration mechanism comprising the dirty liquid inlet (3) on a filter body (2), an insert (4) part where the dirty liquid is cleaned while passing from inside to outside, and a clean liquid outlet (5) from which the cleaned liquid gets out of the body (2) and a filter cleaning mechanism for inner flow (6) created inside the filter insert (4). Filter cleaning mechanism for inner flow (6) consists of a back wash outlet (62) generated in the lower section of the body (2), a back wash valve (63) on the back wash outlet (62), a rotatable shaft (61) located inside the insert (4), flow cross-section reducing plates (65) connected to the shaft (61), volume separating rotary disc (64) section and back wash hole (641).

Figure 1:
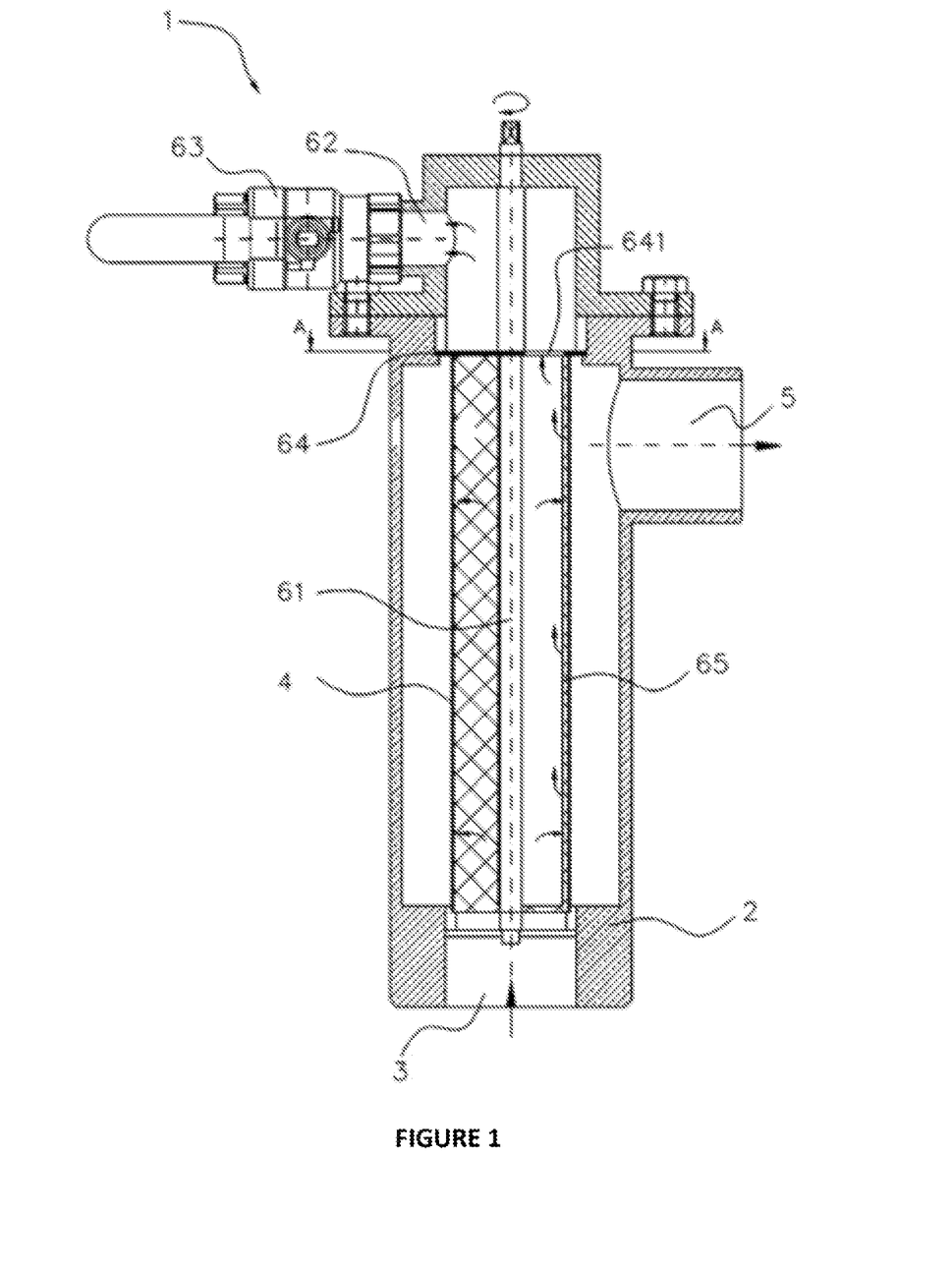
FIG. 1. It is the the front cross-section view of the application of the innovative self cleaning filter mechanism which is the subject of the invention for filters with inner flow system. The open position of the back wash valve has been shown.
Figure 2:
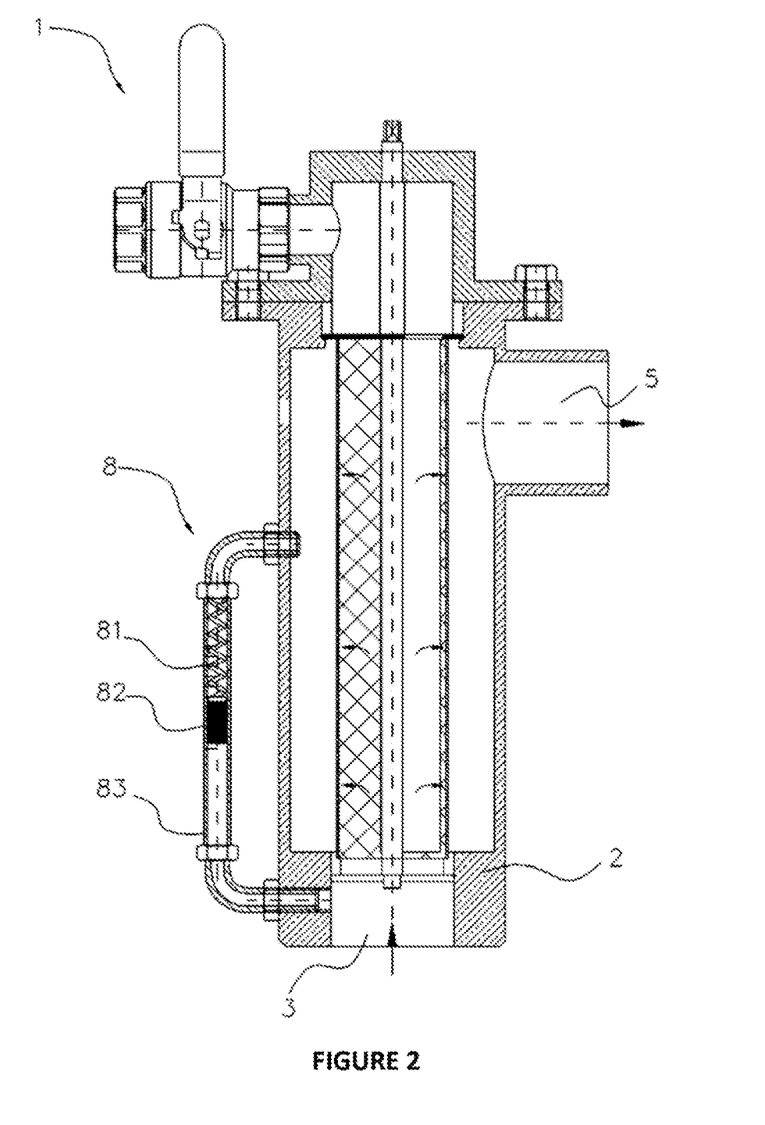
FIG. 2. It is the front cross-section view of the application of the innovative self cleaning filter mechanism which is the subject of the invention with differential pressure measurement for filters with inner flow system. The closed position of the back wash valve has been shown.

In the filtering systems of the self cleaning filler mechanism with inner flow which is the subject of the invention (1), the dirty liquid enters into the body (2) from the dirty liquid inlet (3) comes directly inside the insert (4), and because of the fact that the back wash valve (63) is closed, it passes through the surface of the insert (4) and is cleaned, and after the process of cleaning, it comes to the clean liquid outlet (5), and gets out of the body (2) as cleaned. When a certain contamination occurs in the filter insert, the dirt indication mechanism (8) and the indicator located on it, generate a visual or acoustic warning to clean the filter by measuring the pressure difference created between the entry and exit of the liquid passing through the insert (4). With the warning that has been created, the user opens the back wash valve (63) automatically or manually, and the liquid passes through the flow cross section reducing plates (65) and the back wash hole (641), and is discharged from the back wash outlet (62). With the creation of the fluid flow between the flow cross section reducing plates (65) and the inner surface of the insert (4), the liquid in the other section of the insert makes a speedy passage through the gap between the flow cross section reducing plates (65) and the surface of the insert (4), and therefore, causes a pressure drop in the sections where the flow cross section reducing plates (65) lay. Together with the pressure drop generated in the sections where the flow cross section reducing plates (65) lay on the surface of the insert (4), the cleaned liquid between the body (2) and the insert (4) enters into the insert (4) again, and provides the cleaning of the dirt and solid particles on the surface of the insert (4) in the sections where the pressure drops.

Figure 3:
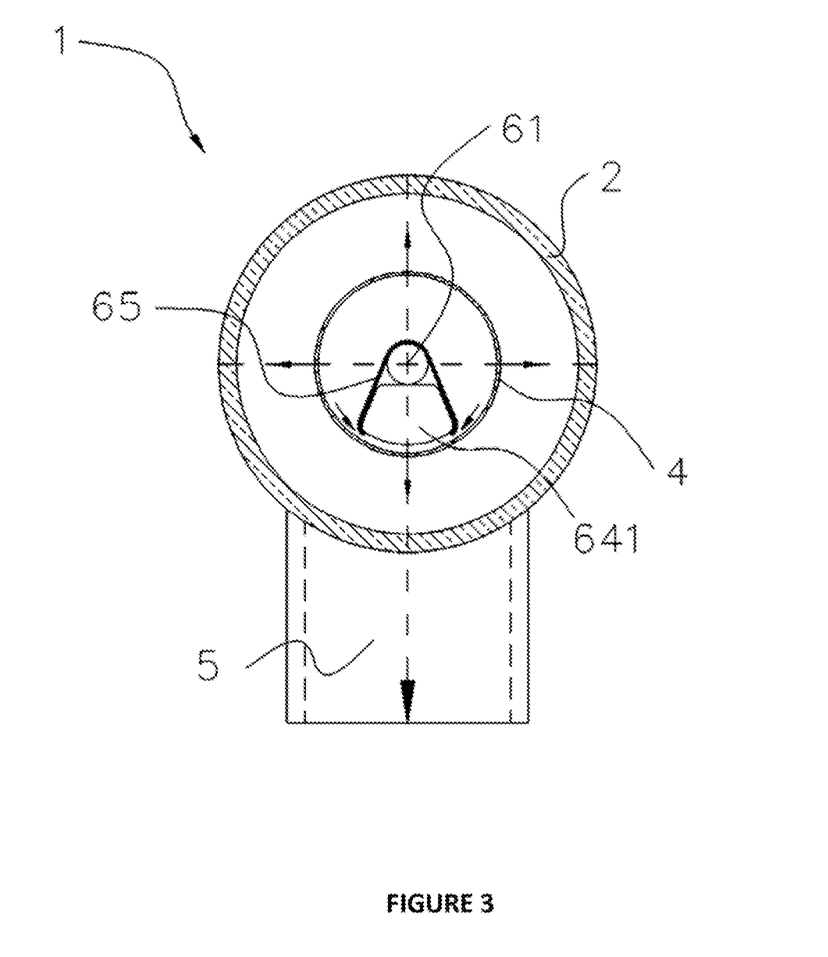
FIG. 3. It is the top cross-section view of the application of the innovative self cleaning filter mechanism which is the subject of the invention for filters with inner flow system.
Figure 4:
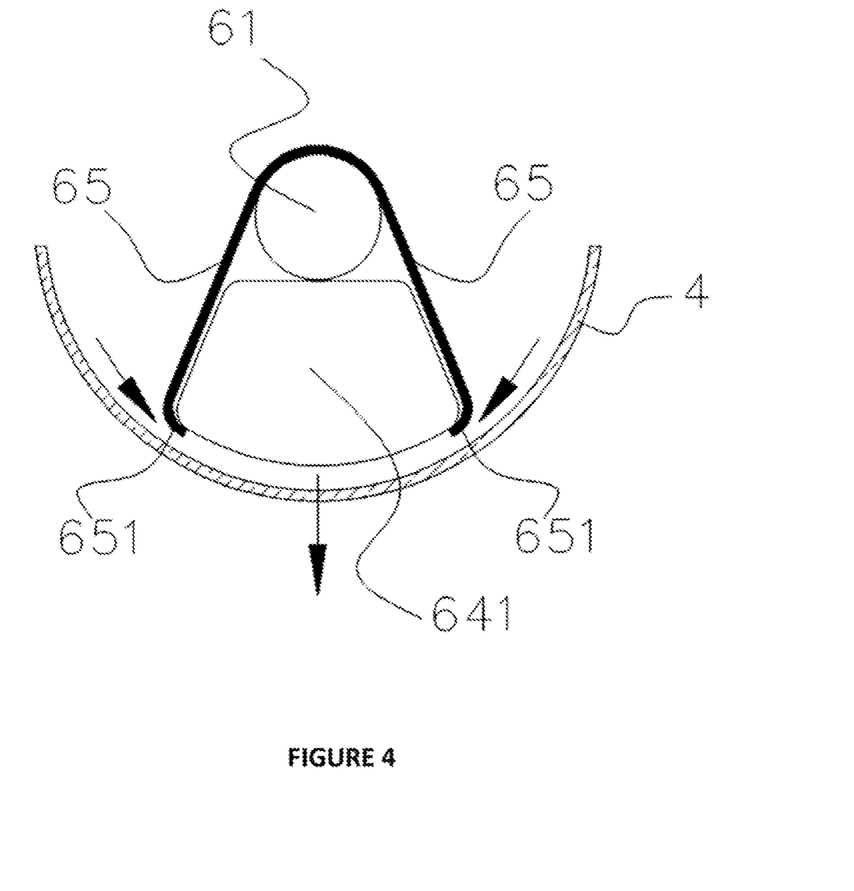
FIG. 4. It is the top cross-section detail view of the application of the innovative self cleaning filter mechanism which is the subject of the invention for filters with inner flow system.

In order that the filter cleaning system with inner flow (6) can clean all the surfaces of the filter insert (4), the shaft (61) part, the back wash hole (641) on the volume separating rotary disk (64) enabling the passage of the liquid to the back wash outlet (62) and the flow cross section reducing plates (65) are rotated. With this rotation process, the shaft (61) with the back wash hole (641) making a centered rotational movement and the flow cross section reducing plates (65), enable the entry of the liquid into the insert (4). With the realization of the process of rotation of the shaft (61) fully 360 degrees, the process of cleaning can affect the entire insert (4) surface.

Another feature of the self cleaning filter mechanism (1) which is the subject of the invention is the fact that the dirty liquid can directly enter among the flow cross-section reducing plates (65) also when the back wash valve (63) is closed, and that the filter mechanism (1) is not required to be taken out from inside. Even if the back wash valve (63) is closed, the liquid fills along the flow cross-section reducing plate (65) ends towards the inside of the the insert (4) and the filtering process can be realized on all the insert (4) surfaces.

In another application of the invention, in the flow cross-section reducing plate (65) ends which are located in the filter cleaning system with inner flow (6), and are extending towards the surface of the insert (4), there are orientation slopes (651) extending towards the gap between the flow cross-section reducing plates (65). Thanks to the orientation slopes (651) created, the area of passage of the liquid in the insert (4) between the flow cross-section reducing plates (65) and the inner surface of the insert (4), i.e, the area where speed of the liquid is increased, and the pressure in the passage sections of the liquid is enabled to be in lower values in a larger area.

In an application of the invention, a pneumatic or hydraulic or electrical system (Actuator) is used for the automatic opening and closing of the back wash valve (63) enabling the start and finish of the cleaning process of the filter cleaning system with inner flow (6).

In an application of the invention, a solenoid valve is used for the automatic opening and closing of the back wash valve (63) enabling the start and finish of the cleaning process of the filter cleaning system with inner flow (6).

In an application of the invention, a pneumatic or hydraulic system (Actuator) is used for the rotation movement of the shaft (61) enabling the cleaning process created by the filter cleaning system with inner flow (6) to affect the whole surface of the insert (4).

In an application of the invention, an electrical actuator is used for the rotation movement of the shaft (61) enabling the cleaning process created by the filter cleaning system with inner flow (6) to affect the whole surface of the insert (4).

Figure 5:
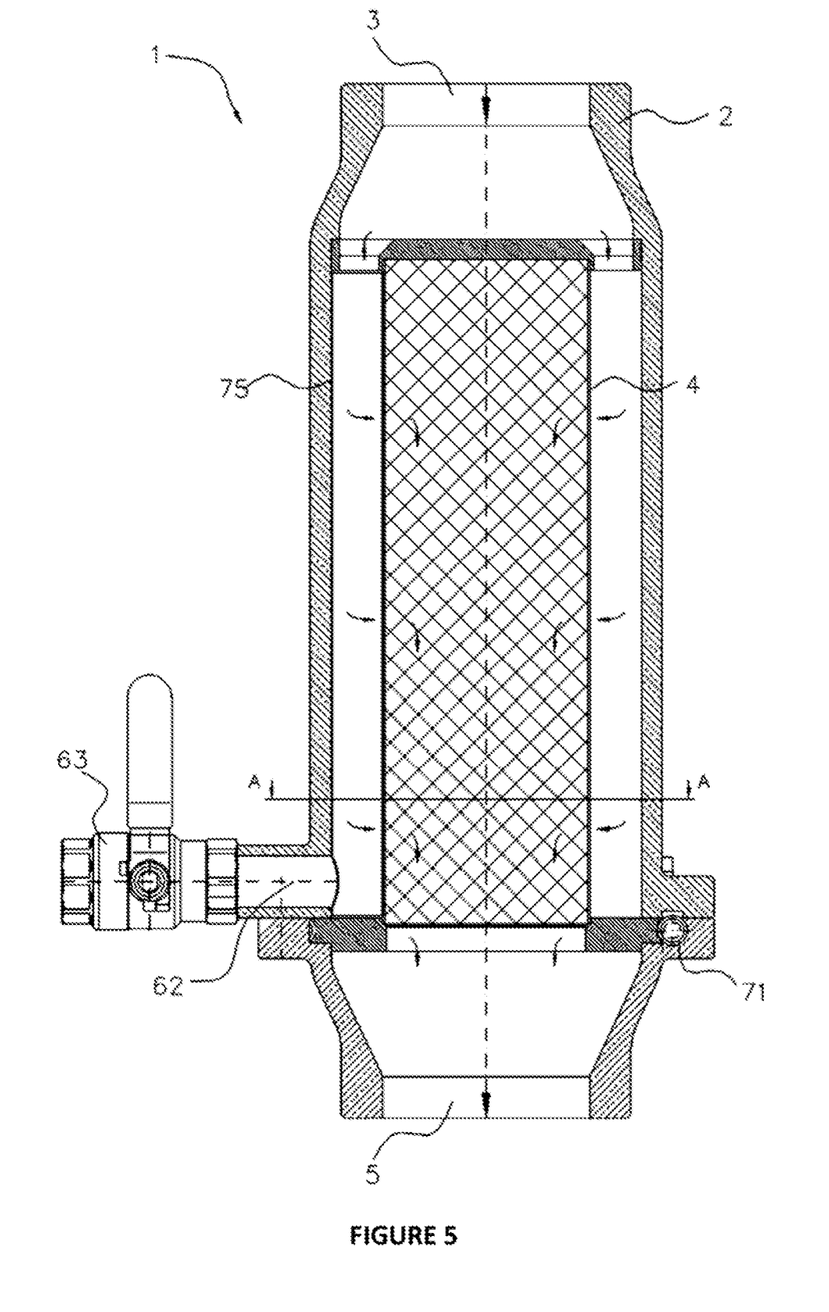
FIG. 5. It is the front cross-section view of the application of the innovative self cleaning filter mechanism which is the subject of the invention for filters with outer flow system.

In another application of the invention, the self cleaning filter mechanism (1) that enables to clean the dirt particles accumulating in the filter systems with outer flow (FIG. 5) without opening the filter cover, contains;

at least one body (2) into which the liquid to be cleaned enters and exits and as the outer surface of the mechanism in which the filtering process is made, at least one dirty fluid inlet (3) enabling the passage of the dirty fluid desired to be cleaned into the filter body (2), at least one insert (4) where the dirty liquid coming from the dirty liquid inlet (3) is cleaned by being filtered as it enters inside from outside, at least one clean liquid outlet (5) where the liquid cleaned at the insert (4) exits out of the body (2), applied between the filter insert and the body (2) and, at least one applied rotating system (71) on the body (2) and the insert (4) and enabling the insert to rotate around its own axis, at least one back wash outlet (62) located between the body (2) and the insert (4), situated in the section of the insert that is opposite of the flow direction of the dirty liquid and enabling the dirty liquid coming to between the insert (4) and the body (2) to get directly outside without being cleaned, and at least one drain valve (63) enabling the liquid passage from the back wash outlet (62) to be opened and closed, at least one cleaning mechanism with outer flow (7) between the back wash outlet (62) and dirty liquid inlet (3) extending from over the body (2) towards the surface of the insert (4), and containing at least two outer flow cross-section reducing plates (75) creating a liquid discharge channel between the insert (4) and the body (2) with the opening of the back wash valve (63), providing higher speed flow in the passage of the liquid between the body (2) and the insert (4) through the gap between the outer flow cross section reducing plates (75) and the surface of the insert (4), and pressure drop in that area (Bernoulli Effect) during the rapid passage and a process of cleaning on the surface of the insert (4) along with the passage of the liquid from inside to outside of the insert (4)

at least one dirt indicator mechanism (8) determining the filter contamination rate and whose one side is connected to the dirty liquid inlet (3), and the other side is connected to the section where the filtered liquid is located between the body (2) and the insert (4), and through which the piston part (82) changes location in the transparent tube (83) depending on the pressure force applied by the pressure difference on the spring (81)

The filter (FIG. 5) systems with outer flow of the self cleaning filter mechanism (1) which is the subject of the invention consist of; a dirty fluid inlet (3) on the filter body (2), a liquid filtering mechanism consisting of an insert (4) section through which the dirty liquid is cleaned as it passed from outside to inside, and a clean liquid outlet (5) through which the cleaned liquid comes out through the insert (4), and a filter cleaning mechanism with outer flow (7) created between the filter insert and the body (2). The filter cleaning mechanism with outer flow (7) consists of a back wash outlet (62) generated in the lower part of the body (2), a back wash valve (63) on the back wash outlet (62), an insert rotating system (71) enabling the insert to rotate around its own axis and two outer flow cross-section reducing plates (75) extending over the body (2) towards the top of the surface of the insert (4).

Figure 6:
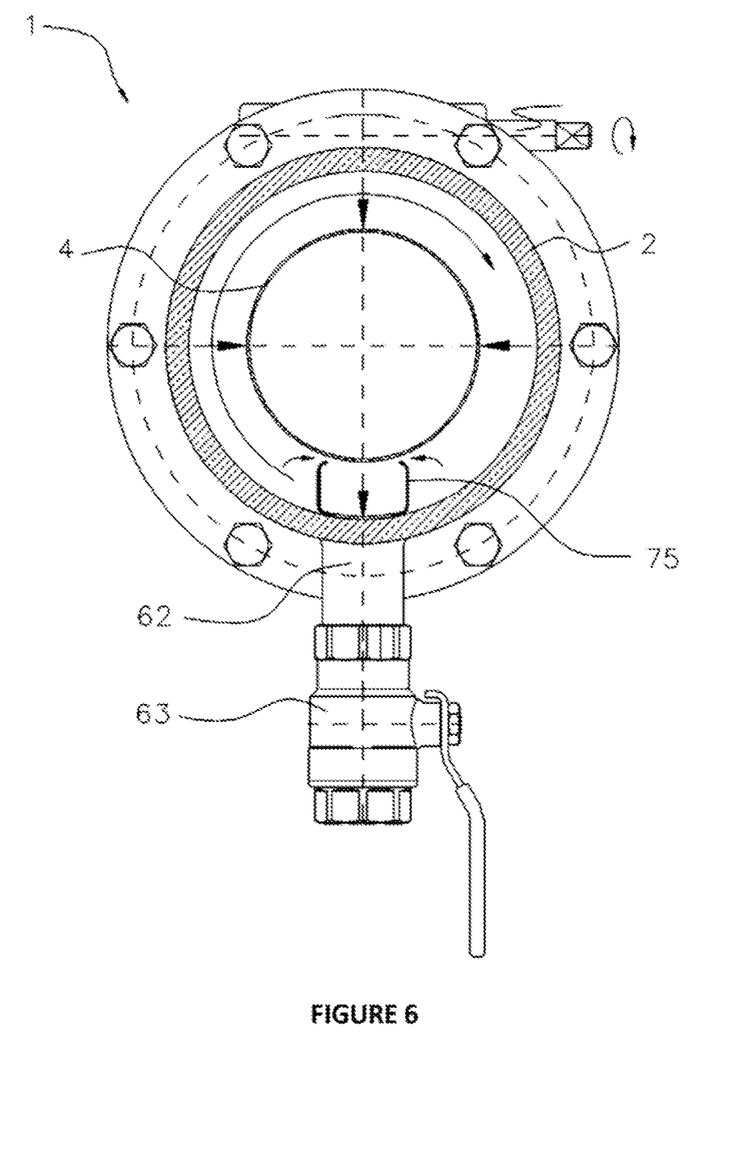
FIG. 6. It is the top cross-section view of the application of the innovative self cleaning filter mechanism which is the subject of the invention for filters with outer flow system.

In the filtering process of the self cleaning filter mechanism (1) with outer flow which is the subject of the invention, the dirty liquid that enters into the body (2) through the dirty liquid inlet (3) accumulates between the body (2) and the insert (4), and enters into the insert (4) because the back wash valve (63) is closed, and exits out of the clean liquid outlet (5) by being cleaned dining the passage into the insert (4). When a certain contamination in the filter insert occurs, a visual warning is generated to clean the filter on the dirt indication mechanism (8) and the indicator located on it, generate a visual warning to clean the filter by measuring the pressure difference created between the entry and exit of the liquid passing through the insert (4). With the warning that has been created, the user opens the back wash valve (63) automatically or manually, and the liquid passing through the flow cross section reducing plates (75) on the body (2) is discharged from the back wash outlet (62). With the creation of the fluid flow between the outer flow cross section reducing plates (75), the dirty liquid between the body (2) and the insert (4) makes a speedy passage through the gap between the outer flow cross section reducing plates (75) and the surface of the insert (4), and therefore, causes the pressure drop in the sections where the outer flow cross section reducing plates (75) lay. Together with the pressure drop generated in the sections where the outer flow cross section reducing plates (75) lay on the surface of the insert (4), the cleaned liquid in the insert (4) enters between the insert (4) and the body (2) again from the sections where the pressure drops and provides cleaning of the dirt and solid particles on the surface of the insert (4) in the sections where the pressure drops.

Another feature of the self cleaning filter mechanism (1) that is the subject of the invention is the fact that the dirty liquid can directly enter among the outer flow cross-section reducing plates (75) also when the back wash valve (63) is closed, and it is not required to take the filter mechanism (1) from inside. When the back wash valve (63) is closed the dirty liquid fills both inside the insert (4) and the body (2), and also among the outer flow cross-section reducing plates (75), and the process of filtering can be realized over all the insert (4) surfaces.

In order to be able to clean all the surfaces of the insert of the cleaning mechanism for outer flow, a gear box has been generated in the lower section of the body (2) of the insert (4), to be able to perform a rotation of the insert body (4) on its own axis manually or automatically. During the rotating process created, the outer flow cross section reducing plates (75) remain fixed on the body (2), and with the process of rotating of the insert (4) around its own axis, the pressure drop can be applied on the whole surface of the insert (4).

Figure 7:
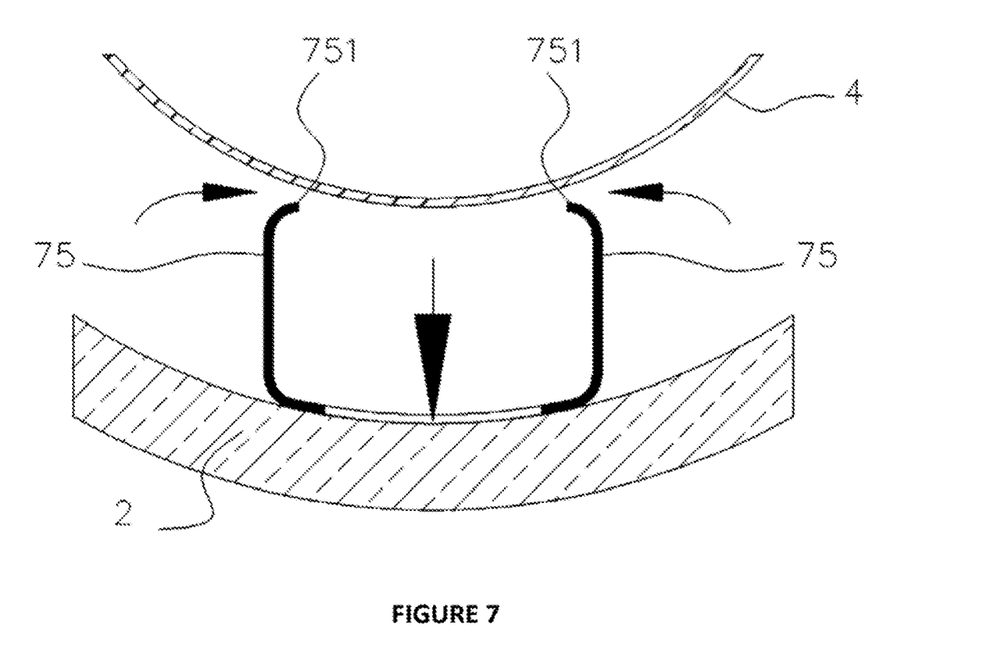
FIG. 7. It is the top cross-section detail view of the application of the innovative self cleaning filter mechanism which is the subject of the invention for filters with outer flow system.

In an application of the invention, in the end parts of the outer flow cross section reducing plates (75) located in the filter cleaning system with outer flow (7) extending towards the surface of the insert (4), there are external orientation slopes (751) extending towards the gap between the outer flow cross section reducing plates (75). Thanks to the external orientation slopes (751) created, the area of passage of the liquid outside the insert (4) between the outer flow cross section reducing plates (75) and the surface of the insert (4), hence, the area where its speed is increased, and the pressure in the passage sections of the liquid is enabled to be in lower values in a larger area.

In an application of the invention, a pneumatic or hydraulic or electrical system (Actuator) is used for the automatic opening and closing process of the back wash valve (63) enabling the start and finish of the cleaning process of the cleaning system with outer flow (7).

In an application of the invention, a solenoid valve is used for the automatic opening and closing of the back wash valve (63) enabling the start and finish of the cleaning process of the filter cleaning system with outer flow (7).

In an application of the invention, a pneumatic or hydraulic system (Actuator) is used for the rotation movement of the insert rotating system (71) enabling the cleaning process in the filter cleaning system with outer flow (7) to affect the whole surface of the insert (4).

In an application of the invention, an electric actuator is used for the rotating movement of the insert rotating system (71) enabling the cleaning process in the filter cleaning system with outer flow (7) to affect the whole surface of the insert (4).

In an application of the invention, a dirt indicator mechanism (8) containing a transparent tube (83) whose one side is connected to the dirty liquid inlet (3), and the other side is connected to the section where the liquid is located between the body (2) and the insert (4), and a spring (81) located in the transparent tube (83) moving with the pressure difference created, and a piston part (82) moving with the force of the spring (81), enabling the contamination rate to be monitored from outside along with the piston part's (82) changing location in the transparent tube (83). This dirt indicator mechanism can be used in the cleaning mechanism with inner flow (6) and cleaning mechanism with outer flow (7).

I claim:

1. A self cleaning filter system, comprising
a filter body wherein dirty fluid to be cleaned enters and exits, and constitutes an external surface of the system,
a dirty liquid inlet,
an insert for filtering the dirty fluid while the dirty fluid moves from inside of the insert to outside of the insert,
a liquid outlet for allowing a cleaned liquid to exit;
wherein the insert comprises:
a shaft located longitudinally inside the insert having a rotational freedom on a filter center axis,
a back wash outlet located on the filter body enabling dirt particles to be accumulated in an inner surface of the insert to be thrown outside, and
a back wash valve enabling the opening and closing of a liquid passage from the back wash outlet,
a volume separating rotary disc located between the insert and the back wash outlet, wherein the center axis of the volume separating rotary disc is connected to the center axis of the shaft, and having at least one back wash hole, where the shaft does not pass through the at least one back wash hole, and the dirty liquid passes through the at least one back wash hole and to the back wash outlet by the opening of the back wash valve,
an inner-flow filter cleaning mechanism with at least two flow cross section reducing plates extending from two sides of the shaft towards the inner surface of the insert between the at least one back wash hole and the dirty liquid inlet creating a fluid flow channel on the inner surface of the insert with the opening of the back wash valve, the at least two flow cross section reducing plates each having ends comprising orientation slopes which do not contact the insert and the ends extend toward a gap between the at least two flow cross section reducing plates and therefore form a plurality of gaps extending an entire length of the flow cross section reducing plates which faces the inner surface of the insert and provide a plurality of reduced flow cross sections formed between each of the ends of the cross section reducing plates and the inner surface of the insert towards the at least one back wash hole creating a Bernoulli Effect during the liquid passage, wherein increase in the speed of the liquid entering into the fluid flow channel, facilitates a cleaning process on the inner surface of the insert with an entrance of the liquid from the outside of the insert into the inside of the insert in the fluid flow channel where pressure drops, wherein,
the self cleaning filter system is capable of being inserted in an apparatus and capable of cleaning the dirt particles accumulated in the apparatus without opening a cover of the apparatus.

2. The self cleaning filter system, as in claim 1, wherein a pneumatic or a hydraulic system enables the rotation of the shaft.

3. The self cleaning filter system, as in claim 1, wherein an electrical actuator enables the rotation of the shaft.

4. The self cleaning filter system, as in claim 1, wherein an actuator in form of a pneumatic or hydraulic or electrical system realizes start and finish of the cleaning process in the self cleaning filter system with outer flow and inner flow, enabling the back wash valve to be opened and closed automatically.

5. The self cleaning filter system, as in claim 1, wherein a solenoid valve realizes start and finish of the cleaning process in the self cleaning filter system with outer flow and inner flow, enabling the back wash valve to be opened and closed automatically.

6. The self cleaning filter system, as in claim 1, wherein a dirt indicator mechanism is connected to the dirty liquid inlet, and to a section where there is filtered liquid between the filter body and the insert, determines a filter dirt rate by measuring a pressure difference between the section to which the dirt indicator mechanism is connected.

7. The self cleaning filter system, as in claim 6, wherein the dirt indicator mechanism contains at least one transparent tube, at least one spring located in the transparent tube and moving with the pressure difference, and a piston part that can move with force of the spring, and enables monitoring of the filter dirt rate from outside with a location change of the piston part in the transparent tube.

8. A self cleaning filter system comprising;
a filter body which, constitutes an external surface of the system,
a dirty liquid inlet,
a filter insert for filtering a dirty fluid, from outside of the insert to inside of the insert,
a clean liquid outlet for allowing cleaned liquid to exit, wherein,
at least one back wash outlet located between the filter body and the insert, and at least one back wash valve enabling the opening and closing of a liquid passage from the back wash outlet,
at least one cleaning mechanism for outer flow having at least two outer flow cross-section reducing plates fixed on the filter body and between the back wash outlet and the dirty liquid inlet, the two outer flow cross-section reducing plates each having ends comprising orientation slopes which do not contact the filter insert and the ends extend over the filter body towards the outer surface of the filter insert, the ends extend toward a gap between the at least two outer flow cross section reducing plates and therefore form a plurality of gaps that provide a plurality of reduced flow cross sections formed between the at least two outer flow cross-section reducing plates ends and the outer surface of the filter insert and constituting a liquid discharge channel between the filter insert and the filter body with the opening of the back wash valve, enabling the liquid passage, wherein increase in the speed of the liquid entering the liquid discharge channel between the filter body and the insert causes a pressure drop in the plurality of gaps therefore creating a Bernoulli Effect during the liquid passage, and generating a cleaning process on the surface of the insert with the passage of the liquid from the inside of the filter insert to the outside of the filter insert, wherein, the self cleaning filter system is capable of cleaning of dirt particles accumulated during filtering process with outer flow without opening a cover of the self cleaning filter system.

9. The self cleaning filter system, as in claim 8, wherein at least one insert rotating system is generated on the filter body of the filter insert and enables the applicability of the cleaning process around the whole surface of the filter insert by enabling the filter insert to make a rotation movement around an axis of the filter insert.

10. The self cleaning filter system, as in claim 9, wherein at least one pneumatic or hydraulic system enables the cleaning process in the self cleaning filter system with outer flow to affect the whole surface of the filter insert and realizing the rotation movement of the insert rotation system.

11. The self cleaning filter system, as in claim 9, wherein an electrical actuator enables the cleaning process in the self cleaning filter system with outer flow to affect the whole surface of the filter insert and providing drive for the rotation movement of the insert rotation system.

\* \* \* \* \*